April 28, 1942.  C. J. CALBICK ET AL  2,280,890
LUMINESCENT SCREEN
Filed April 5, 1940
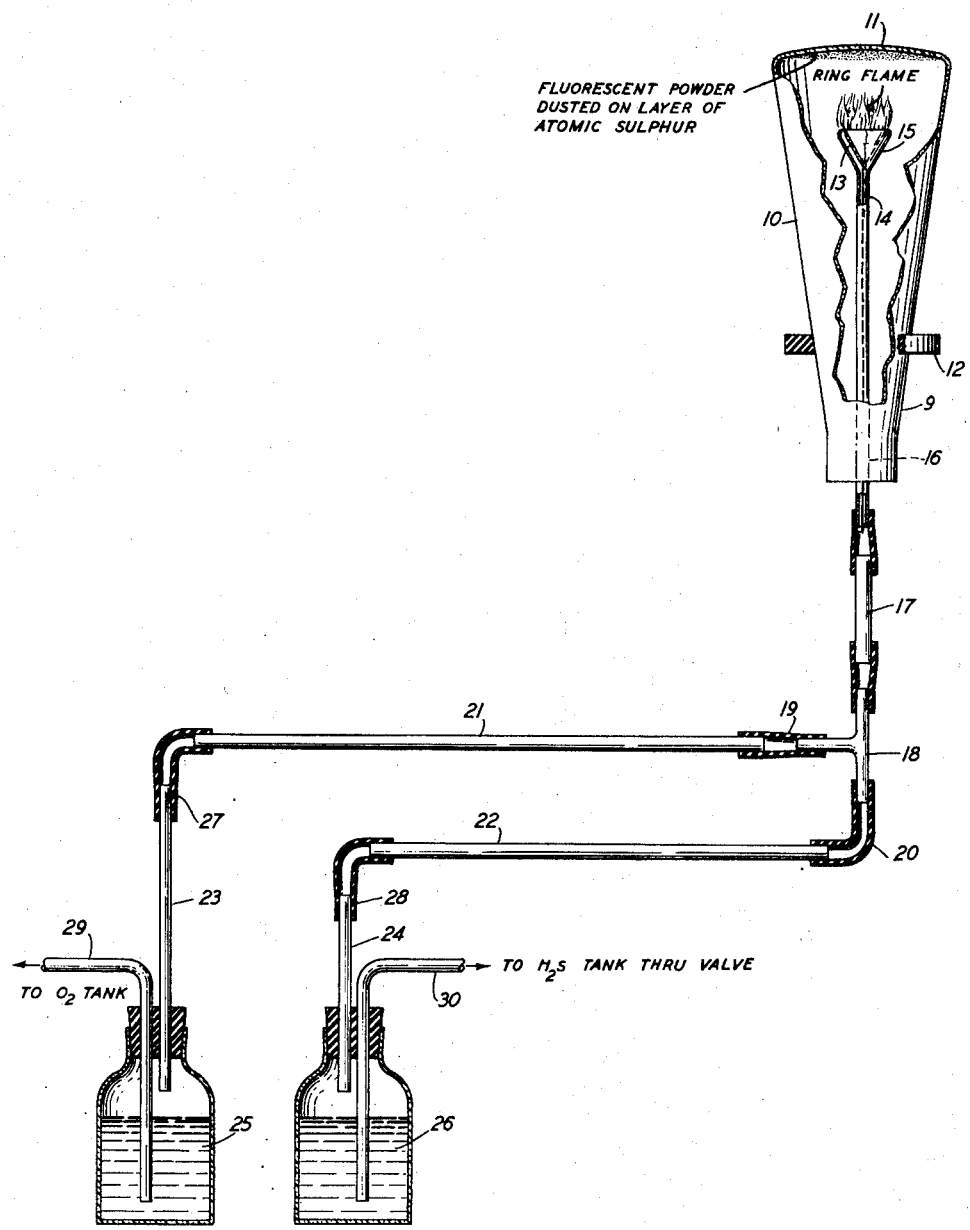
INVENTORS C. J. CALBICK
J. B. JOHNSON
BY
*Chas Sprague*
ATTORNEY Patented Apr. 28, 1942

2,280,890

UNITED STATES PATENT OFFICE 2,280,890

LUMINESCENT SCREEN

Chester J. Calbick, Summit, and John B. Johnson, Maplewood, N. J., assignors to Bell Telephone Laboratories, Incorporated, New York, N. Y., a corporation of New York Application April 5, 1940, Serial No. 327,958

7 Claims. (Cl. 91—70)

This application relates to luminescent screens and more particularly to the method of coating fluorescent screens on supporting members.

It is an object of this invention to provide a novel method of binding fluorescent material to a supporting structure.

It is another object of this invention to provide a novel method of coating fluorescent screens on supporting surfaces by the use of sulphur as a binder.

In the manufacture of cathode ray tubes, it is frequently desired to use as a screen certain fluorescing powders, such as mixtures of zinc and cadmium sulphides activated with copper and manganese, this mixture producing a white luminescence. These powders lose their fluorescent efficiency when baked appreciably above 300° centigrade and since it is desired to coat, in the usual case, the conical walls of the cathode ray tube with a conducting coating for a final anode member, which coating is of any suitable material such as the product known to the trade as "Aquadag" and which must be baked at 450° centigrade to remove volatile impurities, the fluorescent screen must be made after the conducting coating has been baked on in order that the fluorescent efficiency of these powders be maintained. This means that the screen must be satisfactory the first time it is made, since re-coating a bulb which has an unsatisfactory screen requires thorough cleaning of the bulb interior, application and baking-on of the Aquadag, and finally another coating of the fluorescent screen. With powders of this type the coating methods described in the prior art have been unsuccessful in producing satisfactory screens. The use of sulphur as a binding material is suggested in an article by Mr. W. H. Kohl published in the Canadian Journal of Research A13, page 126, 1935. In the method described in this article, a glass surface to be coated is covered with sulphur "soot" (believed to be a mixture of molecular and atomic sulphur) by immersing the glass surface in a flame of burning carbon disulphide ($CS_2$). The fluorescent powder is then either dusted on to the sulphur covered surface to a desired thickness or shaken in bulk over the sulphur covered surface, the excess powder being finally poured off the surface. In the method described in the Kohl article the thickness of the final screen is determined by the density of sulphur "soot" deposited. The sulphur is then removed by evacuation either by baking in vacuum or in a gentle stream of flowing gas. The screen produced by this method is not as firmly adherent to the surface of the glass as desired.

In an effort to improve the adherence of screens using sulphur as a binding material, various forms of sulphur have been tried in an attempt to produce an improved binder. Colloidal sulphur, that is sulphur dust, produces a screen which is mechanically inadequate after the tube is vacuum baked. Sulphur "soot" produces a somewhat more adherent screen but, as pointed out above, is not as adherent as it is desired to make it. It has been discovered that a thin film of sulphur, believed to be primarily atomic sulphur and given the name of "haze" film, produces more closely adherent fluorescent screens than any of the other sulphur binders and is therefore an important improvement thereover.

In an effort to produce a thin atomic film of sulphur on the end wall of a cathode ray tube or bulb (or other supporting member), a number of chemical reactions have been tried. Notable among these reactions is the Peachey process used in the cold vulcanization of rubber. In this process hydrogen sulphide and sulphur dioxide are reacted to produce atomic sulphur. This reaction is as follows:

$$2H_2S + SO_2 \rightarrow 2H_2O + 3S \qquad (1)$$

Atomic sulphur so produced will not deposit on a clean dry glass surface. This is probably due to the fact that the glass is covered with layers of adsorbent gas and this appears to be sufficient to prevent the direct deposition of atomic sulphur upon dry glass surfaces. It does deposit very rapidly if the surface is wet or slightly moistened by condensation of water vapor. The water produced in the chemical reaction soon produces an excess which trickles over the surface carrying with it suspended atomic sulphur. A considerable number of experiments have been conducted in an unsuccessful attempt to coat the bulb uniformly with sulphur by uniformly wetting the surface.

Another method tried is that involving the burning of hydrogen sulphide ($H_2S$) in place of the $CS_2$ of the process described in the Kohl article. Attempts to form "haze" film (primarily atomic sulphur) by burning $H_2S$ in a cathode ray bulb were not very satisfactory until it was discovered that the failure was due to an excess of oxygen in the bulb initially with consequent oxidation of sulphur. It has been discovered that when $H_2S$ is burned in a deficiency of oxygen, atomic sulphur is liberated and a fine almost uniform "haze" film, which is believed to be primarily atomic sulphur, is deposited. What is meant by the term "deficiency of oxygen" may be understood from the following equation. Consider the reaction:

$$2H_2S + O_2 \rightarrow 2H_2O + 2S \qquad (2)$$

In this reaction atomic sulphur and water are produced. Now consider the reaction where an ample or excess amount of oxygen is available:

$$2H_2S + 3O_2 \rightarrow 2H_2O + 3SO_2 \qquad (3)$$

It will be seen that in the reaction represented by Equation 3 sulphur dioxide and water are formed which can and do combine to form sulphurous acid ($H_2SO_3$) which is not suitable as a binder. As a matter of fact it can be stated that, in general, neither of the reactions represented by Equations 2 and 3 actually takes place. In order to arrive at the desired percentage of $H_2S$ and $O_2$ in the mixture being burned, the following equations are pertinent. One reaction between $H_2S$ and $O_2$ is:

$$2H_2S + 3O_2 \rightarrow 2H_2O + 2SO_2 \qquad (4)$$

A reaction between sulphur dioxide and additional $H_2S$ may be written as follows:

$$4H_2S + 2SO_2 \rightarrow 4H_2O + 6S \qquad (5)$$

Equation 5 is the so-called Peachey reaction named for its discoverer in the process of vulcanization of rubber and is equivalent to Equation 1 above. If Equations 4 and 5 are added together it can be seen that, $$6H_2S + 3O_2 = 6H_2O + 6S \qquad (6)$$

This indicates that the mixture to be burned should consist of two parts of $H_2S$ to one part of $O_2$. Actually it is very difficult to get a mixture so deficient in oxygen to burn in a nitrogen atmosphere, the atmosphere generally used. On the other hand a mixture rich in oxygen, such as two parts $H_2S$ to three parts $O_2$ produces the reaction represented by Equation 4 and virtually no atomic sulphur. The film deposited on the glass is then watery, undoubtedly being mostly $H_2SO_3$. It is impossible to produce a good screen by dusting fluorescent powder on such a film. Best results are obtained when the oxygen in the mixture is reduced to a point where it will just burn in a nitrogen atmosphere. In this condition the flame is long, flickering and bluish. As the oxygen content is increased, the flame becomes short, intense and yellowish, the color presumably being due to sodium from the pyrex glass burner which was used in the method performed in accordance with this invention. It is therefore very easy to adjust the flame to the correct condition. Fairly good films are obtained with mixtures such as three parts $H_2S$ to two parts $O_2$ but poor films result if the number of parts of $O_2$ is allowed to exceed the number of parts of $H_2S$.

After the "haze" film is formed it is dried and fluorescent powder dusted on. The neck of the bulb is then sealed on and the whole bulb nitrogen baked. It may then have, if desired, a baking operation in vacuum but this is not essential. The gun of the tube is then sealed-in and the tube then pumped. Mechanically, the screen formed by this process stands fairly severe mechanical shocks and, in general, a very satisfactorily adherent screen is produced.

In one form of apparatus for forming the binding layer of this invention, the cathode ray bulb is supported by any suitable means and a burner which gives a ring-shaped flame is placed inside the tube. Pipes leading to supplies of oxygen and $H_2S$ are connected to the burner and valved to produce the correct proportions of these two in the resultant mixture supplied to the burner. The burning takes place in an atmosphere of nitrogen or other suitable inert gas such as argon, neon or helium. The oxygen ($O_2$) and the $H_2S$ are preferably bubbled through water before they pass into the burner.

The invention will be more readily understood by referring to the following description taken in connection with the accompanying drawing forming a part thereof in which the single figure shows apparatus suitable for forming the binding layer of this invention although it is to be understood that any other appropriate apparatus may be used as well.

Referring more particularly to the drawing, the single figure shows, by way of example, a satisfactory form of apparatus for carrying out certain of the steps of the method of this invention. In the apparatus shown in this figure a cathode ray tube 9 having a conducting coating 10 on the side walls thereof has an end wall 11 to which is to be applied a fluorescent screen by the method of this invention. Due to the fact that the fluorescent screen must be baked at a temperature not exceeding approximately 300° centigrade and because the conducting coating requires a temperature for baking of about 450° centigrade this coating is placed within the tube before the fluorescent screen is affixed thereto. The conducting coating may be applied to the walls of the tube by any suitable means.

Tube 9 is supported by any suitable means, such as by a ring band 12 which is preferably mounted in a hood (not shown) equipped with proper means for the removal of obnoxious gases.

The first step in the preparation of the fluorescent screen on the end wall 11 of the tube 9 is to form a binding layer consisting primarily of atomic sulphur. In accordance with this invention this binding layer is formed by burning hydrogen sulphide ($H_2S$) and oxygen ($O_2$) in an inert atmosphere, such as for example, nitrogen, argon, helium or neon. Because of its ready availability nitrogen is preferred. While the inert gas is not necessary it is hard to get a controlled flame without it and its use is therefore preferred in the process according to this invention.

The two gases are supplied from their sources (not shown) through a suitable piping system to be described more fully below to a burner which produces a ring-shaped flame. This burner preferably comprises a cone 13 of any suitable high melting point glass such as the product known to the trade as "Pyrex" glass, a wire 14 of any suitable material, such as platinum, is sealed into its vertex, to support it in position within a larger cone 15 of high melting point glass which is sealed near its vertex to a glass tubing 16. The wire 14 passes through the tubing 16 and is hooked around the lower end thereof, being fastened between the tubing 16 and the rubber tubing joining the tube 16 to the glass tube 17. The combination of the two cones 13 and 15 of high melting point glass and the tube 16 having a wire 14 therein forms a burner which yields a ring flame as indicated in the drawing. Obviously, any other suitable burner may be used as well. Connected to the tube 16 and joined thereto by any suitable means, such as by the T-shaped member 18 of glass material and by the rubber tubes 19 and 20, are the two tubes 21 and 22 preferably of glass which connect through tubes 23 and 24 to the bottles 25 and 26 containing water. Rubber tubing 27 and 28 may be used to connect the tubes 21 and 22 to the tubes 23 and 24, respectively. Tubes 29 and 30 leading through valves (not shown) to tanks of oxygen ($O_2$) and hydrogen sulphide ($H_2S$), not shown, also project into the bottles 25 and 26. By this means the gas is allowed to bubble through the water so that by comparing the rate of bubbling the relative amounts of $O_2$ and $H_2S$ in the resultant mixture may be observed and controlled.

The operation of the apparatus shown in the drawing to produce a fluorescent screen by the method of this invention is as follows: With the burner formed by the members 13, 14, 15 and 16, outside the flask or bulb 9, the $H_2S$ is turned on and the gas escaping between the cones 13 and 15 is ignited to produce a ring-shaped flame. The oxygen ($O_2$) is then turned on and valved so that its rate of bubbling through the water bottle 25 is about one-half that of the rate of the bubbling of the $H_2S$ through its water bottle 26. This produces a fairly hot blue flame burning in air. The burner is then inserted in the tube or flask 9 which has been previously filled with nitrogen or any other suitable inert gas. The flame changes its character, becoming larger and less hot. Since the oxygen present is not large compared to the amount of $H_2S$, the flame may be extinguished. The correct adjustment gives just sufficient oxygen for combustion to continue in a nitrogen or other inert gas atmosphere. By Equation 6 above, the proper mixture to be burned consists of two parts of $H_2S$ to one part of $O_2$. Actually it is difficult to get a mixture so deficient in oxygen to burn in a nitrogen atmosphere. On the other hand, a mixture rich in oxygen, such as two parts of $H_2S$ to three parts of $O_2$ produces the reaction shown by Equation 4 above and virtually no atomic sulphur. The film deposited on the glass by this latter reaction is thin and watery and also invariably mostly sulphurous acid ($H_2SO_3$). It is impossible to produce a good screen by dusting fluorescent powder on such a film. The best results are obtained when the oxygen in the mixture is reduced to a point where it will just burn in a nitrogen or other inert gas atmosphere. In this condition the flame is long, flickering and bluish. As the oxygen content is increased the flame becomes short, intense and yellowish, the color presumably being due to sodium from the glass of the burner. When using the apparatus described above, it is very easy experimentally to adjust the flame to the correct condition. Fairly good films of atomic sulphur are obtained with mixtures such as three parts of $H_2S$ and two parts of $O_2$ but poor films result if the number of parts of $O_2$ is allowed to exceed the number of parts of $H_2S$ (all parts are by volume). In general, it can be stated that the ratio of the number of molecules of $H_2S$ to the number of molecules of $O_2$ should be between 1 to 1 and 2 to 1.

The burner is given a rotary motion by any suitable means, such as by hand, on the inside of the flask 9 in order to distribute the "haze" film of atomic sulphur more evenly upon the inside surface of the end wall 11 of the flask 9. The top of the flame is preferably kept fixed at from six to eight inches below the end 11 of the tube 9. Combustion is allowed to proceed for a period of about fifteen to thirty seconds depending on the size of the flask and the size of the flame. The flame is extinguished by shutting off the oxygen supply and finally the $H_2S$ is shut off and the burner removed from the flask.

The flask is thoroughly flushed out with nitrogen before removal from the hood in order to dry the thin film of atomic sulphur. Fluorescent powder is then dusted onto the film either immediately or after the flask has had time to cool (up to approximately one hour after the formation of the atomic sulphur binding layer). A suitable fluorescent powder is that known in the trade as No. 60 powder manufactured by the Patterson Screen Company. This powder is essentially Zn—CdS activated with silver, copper and manganese. Other suitable fluorescent powders are calcium tungstate or synthetic willemite.

The neck (not shown) is then sealed onto the flask 9 and the tube is then baked in a gentle stream of nitrogen at about 300° centigrade for from ten to sixty minutes. The tube is then evacuated and may be, if desired, baked after evacuation although this latter step is not essential. The electron gun is then sealed into the tube and it is then pumped to the required degree of vacuum.

The screen obtained by this method will stand greater mechanical shock than those made by the method suggested in the Kohl article and briefly described above. This method was reproduced and it was found that the screen obtained by such method will not stand the technique of rotating the tube on a lathe in the seal-in process. The screen formed by this method also does not have the disadvantage of the well-known silicate binder (the silicate dries off so fast that mechanical adhesion when dusting on the fluorescent screen is irregular). While glycerine may be used in combination with the silicate binder it has been found that when the glycerine is baked there is a reducing action and areas of non-uniform fluorescence are produced.

Close-packing is the primary reason for adherence. In the sulphur method the atomic sulphur forms a sort of carpet into which the fluorescent particles fall. These particles are very firmly attached to the sulphur because atomic sulphur exerts unusually large surface adhesion forces on other materials and hence is very firmly adherent both to the glass and to the particles. When the screen is baked, the atomic sulphur liquefies (at a temperature of 122° centigrade) and redistributes itself so that each of the particles probably becomes covered with a film of atomic sulphur. At the same time the atomic sulphur is probably recombining to form molecular sulphur in the interstices between the particles. Since there is only a limited supply of sulphur, this last process may use up all the sulphur before all the particles are completely covered with the film of atomic sulphur. As the temperature is further raised, the sulphur begins to evaporate, probably first from the interstices where molecular sulphur has been formed. The sulphur in these regions being liquid, the particles are lubricated and orient themselves under the action of surface (and possible gravitational) forces until, as the sulphur finally completely evaporates, a close-packed layer of particles is formed. It is highly probable that the last layer of atomic sulphur adhering to each particle is so firmly adherent that it cannot be evaporated except at temperatures much higher than those used in baking. Such layers probably act in some degree as a binder to hold the particles even more firmly than would be the case with simple close-packing. The foregoing theory advanced in explanation of the process explains why the sulphur method prevents degradation of the fluorescence during baking. This degradation is a reduction chemical reaction, caused by the breakdown of the zinc and cadmium sulphides composing the fluorescent material. This reduction removes sulphur and leaves metallic zinc and cadmium which injuriously affect the fluorescent particles. In the sulphur method each particle is surrounded by a layer of sulphur, which has the effect of preventing the liberation of metallic zinc and cadmium.

After the completed screen has been formed it is believed to consist primarily of the fluorescent powders themselves although there may be sulphur of the order of one molecule thick, which constitutes a binding layer to cause close adherence between the fluorescent powder and the glass end wall 11 of the tube 9.

Obviously, modifications may be made in the apparatus for carrying out the method of this invention without materially affecting the results. The times and temperatures stated above are not very critical and may be varied somewhat from the values given above.

What is claimed is:

1. A method of forming a fluorescent coating on a supporting member comprising the steps of igniting a mixture of hydrogen sulphide and oxygen near the surface of said member to be coated and maintaining said ignition for a sufficient time to produce a thin film of sulphur thereon, the ratio of the molecules of hydrogen sulphide in said mixture to the molecules of oxygen therein being between 2 to 1 and 1 to 1, and applying fluorescent material to said sulphur film.

2. A method of applying a fluorescent coating to a supporting member comprising the steps of igniting a mixture of hydrogen sulphide and oxygen near the surface of said member to be coated and maintaining said ignition for a sufficient time to produce a thin film of sulphur on the member, drying the resultant film, and then applying fluorescent material to this film.

3. A method of applying a fluorescent coating to a supporting member comprising the steps of igniting a mixture of hydrogen sulphide and oxygen near the surface of said member to be coated and maintaining said ignition for a sufficient time to produce a thin film of sulphur on said member, drying said film, applying fluorescent material to said film to form a screen, and then baking the screen in an inert atmosphere.

4. A method of coating a fluorescent screen on the wall of a cathode ray tube comprising the steps of mixing hydrogen sulphide with oxygen in the proportion of at least one molecule of hydrogen sulphide to one of oxygen, igniting the mixture in an inert gaseous atmosphere near the wall to be coated and maintaining said ignition for a sufficient time to form a thin film of sulphur thereon, applying fluorescent material to the film, and baking the screen in nitrogen.

5. A method of applying a fluorescent coating to the wall of a tube comprising the steps of igniting a mixture of hydrogen sulphide and oxygen near the wall to be coated and maintaining said ignition for a sufficient time to produce a thin film of sulphur thereon, applying fluorescent material to the film, and then baking the coating in a stream of nitrogen at about 300° centigrade.

6. A method of applying a fluorescent coating to a supporting member comprising the steps of bubbling hydrogen sulphide gas through water to a burner, bubbling oxygen through water to the same burner, controlling the rate of bubbling so that the number of molecules of hydrogen sulphide is at least equal to the number of molecules of oxygen, igniting the mixture in said burner, imparting a rotary motion to said burner so that a coating of sulphur is applied to said member, and subsequently applying fluorescent powder to said sulphur layer.

7. A method of forming a fluorescent coating on the inside surface of a bulb comprising the steps of igniting a mixture of $H_2S$ and $O_2$ within the bulb in close proximity to the surface to be coated and in an atmosphere of inert gas, controlling the proportions of $H_2S$ and $O_2$ in the mixture so that the flame is long, flickering and bluish and maintaining the ignition for a sufficient time to produce a thin film of sulphur on said surface, applying fluorescent material to said sulphur film, and baking the tube in a stream of inert gas.

CHESTER J. CALBICK.
JOHN B. JOHNSON.